United States Patent [19]

Natsume et al.

[11] Patent Number: 4,749,897

[45] Date of Patent: Jun. 7, 1988

[54] DRIVING DEVICE FOR PIEZOELECTRIC ELEMENT

[75] Inventors: Yoshimi Natsume, Toyokawa; Yasufumi Yamada, Okazaki; Yasutaka Nakamori, Anjo; Yasuyuki Sakakibara, Nishio, all of Japan

[73] Assignees: Nippondenso Co., Ltd., Kariya; Nippon Soken, Inc., Nishio, both of Japan

[21] Appl. No.: 24,514

[22] Filed: Mar. 11, 1987

[30] Foreign Application Priority Data

Mar. 12, 1986 [JP] Japan .................................. 61-53869
May 16, 1986 [JP] Japan ................................. 61-110510
Oct. 21, 1986 [JP] Japan ................................. 61-250210

[51] Int. Cl.⁴ ........................................... H01L 41/08
[52] U.S. Cl. .................................... 310/317; 310/328; 123/478; 123/498
[58] Field of Search ............... 310/314, 316, 317, 319; 318/118, 116; 239/584, 585; 417/383; 123/478, 494, 498

[56] References Cited

U.S. PATENT DOCUMENTS

| | | | |
|---|---|---|---|
| 3,980,906 | 9/1976 | Koris et al. | 310/317 |
| 4,109,174 | 8/1978 | Hodgson | 310/316 |
| 4,161,670 | 7/1979 | Kern | 310/317 |
| 4,318,062 | 3/1982 | Mitsu et al. | 310/317 X |
| 4,338,576 | 7/1982 | Takahashi | 310/317 X |
| 4,499,878 | 2/1985 | Igashira et al. | 123/478 |
| 4,554,477 | 11/1985 | Ratcliff | 310/317 X |
| 4,560,998 | 12/1985 | Wimmer | 310/317 X |
| 4,595,854 | 6/1986 | Yano et al. | 310/328 X |
| 4,644,212 | 2/1987 | Moritogu et al. | 310/317 |

Primary Examiner—Mark O. Budd
Attorney, Agent, or Firm—Cushman, Darby & Cushman

[57] ABSTRACT

A driving device for a piezoelectric element for electrically driving a piezoelectric element to obtain a predetermined mechanical displacement, the piezoelectric element driving device being provided with a transformer having a primary winding and a secondary winding, the secondary winding being connected to the piezoelectric element; a switching element connected to the primary winding and controlling the amount of energy stored in an air-gap of the core of the transformer; and an energy control means for driving the switching element so that the amount of energy stored in the air-gap of the core of the transformer becomes a set value, the displacement of the piezoelectric element being controlled by the amount of energy stored in the air-gap of the core of the transformer.

5 Claims, 9 Drawing Sheets

Fig. 2
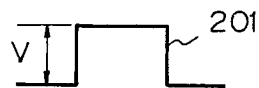
Fig. 3
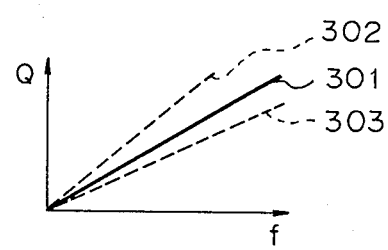
Fig. 4
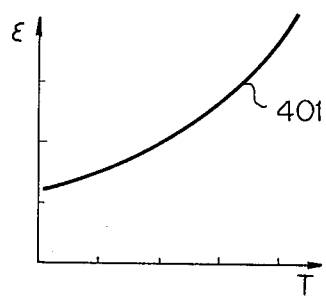
Fig. 5
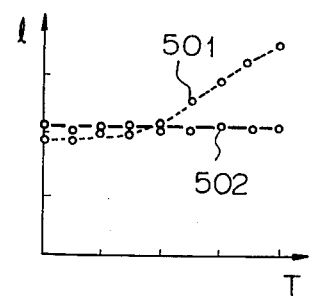

DRIVING DEVICE FOR PIEZOELECTRIC ELEMENT

BACKGROUND OF THE INVENTION

1. Field of the Invention

The present invention relates to a driving device for a piezoelectric element which, in the case of the use of the piezoelectric element as an electromechanical converter, electrically drives the piezoelectric element to obtain a predetermined mechanical output. The present invention more particularly relates to a driving device for a piezoelectric element suitable for use as a piezoelectric actuator, such as for performing reciprocal motion, to thereby provide the mechanical output for a unit injector for supplying fuel to an internal combustion engine, for a hydraulic valve, etc.

2. Description of the Related Art

In the prior art, wide use has been made of rotary electrical machinery, electromagnets, etc. exhibiting electromagnetic phenomena as electromechanical converters. The increased use of electronics for mechanical systems, which has arisen along with the greater sophistication of mechanical systems in recent years, has led to strong demands for higher speeds in solenoid valves and other actuators combining electromagnets and hydraulic circuits.

In accordance with this, there have been proposed various actuators which use piezoelectric elements. Such actuators hold forth the promise of extremely high speed operation free from the problems of eddy current and magnetic energy influx, which limit speeds in the case of application of electromagnetic phenomena. For example, Japanese Unexamined Patent Publication (Kokai) No. 59-77043 discloses an example of the use of the high speed response and high power characteristics of piezoelectric elements for a unit injector.

However, in this type of device, in general a high voltage and large current are demanded as the electrical drive conditions. Therefore, the DC power source becomes large, and caution is required as to the use of high voltage, thus creating a substantial obstacle to practical use. Further, the injection quantity of the unit injector of the above prior art device is changed along with displacement of the piezoelectric element. This displacement is in general controlled by the amount of voltage applied. The amount of displacement, however, has a large temperature coefficient, so there is the problem that precise control of the injection quantity is difficult.

SUMMARY OF THE INVENTION

The present invention, in consideration of the above-mentioned problems, has as its object the provision of a driving device for a piezoelectric element which is compact, features good temperature characteristics, is safe, and enables suitable control of the injection quantity.

To achieve the above object, according to the present invention, there is provided a driving device for a piezoelectric element for electrically driving a piezoelectric element to obtain a predetermined mechanical displacement, the piezoelectric element driving device being provided with a transformer having a primary winding and a secondary winding and having a boosting action, the secondary winding being connected to the piezoelectric element; a switching element connected to the primary winding and controlling the amount of energy stored in an air-gap of the core of the transformer; and an energy control means for driving the switching element so that the amount of energy stored in the air-gap of the core of the transformer becomes a set value, the displacement of the piezoelectric element being controlled by the amount of energy stored in the air-gap of the core of the transformer.

BRIEF DESCRIPTION OF THE DRAWINGS

FIG. 2 is a view showing the voltage applied to the piezoelectric element, the displacement, and the fuel injection rate based on the displacement;

FIG. 3 is a graph of the relationship of the fuel injection quantity per unit time to the frequency by which the piezoelectric element is driven;

FIG. 4 is a graph of the dielectric constant of the piezoelectric element and the temperature;

FIG. 5 is a graph of the displacement of the piezoelectric element with respect to the temperature in the present invention and the prior art;

FIG. 12 is a graph showing the operation of a piezoelectric actuator to which the present invention is applied; and.

DESCRIPTION OF THE PREFERRED EMBODIMENTS

To clarify the background of the present invention, first an explanation will be given of the various characteristics essential to the present invention.

Figure 1:
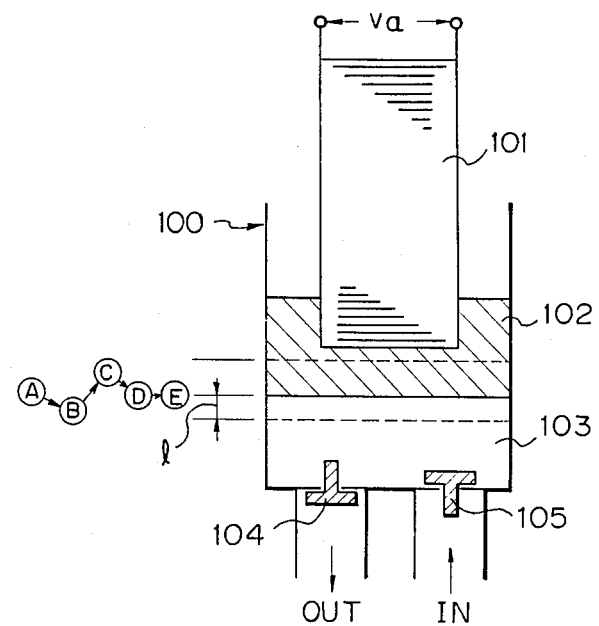
FIG. 1 is a schematic view of a unit injector using a piezoelectric element in accordance with one example of a device to which the present invention is applied.

FIG. 1 is a schematic view of a unit injector 100 for supplying fuel to an internal combustion engine. Along with the expansion of the piezoelectric element 101, a piston 102 pressurizes and injects fuel in the pressure chamber 103 from the fuel injection valve 104. Reference numeral 105 is a check valve. During the contraction of the piezoelectric element 101, fuel is taken in from this passage.

FIG. 2 shows the operational waveforms of the unit injector. The voltage V applied to the piezoelectric element 101 is designated by 201, the displacement 1 by 202, and the fuel injection rate by 203. The fuel quantity Q per unit time, when the applied voltage V is constant, is proportional to the driving frequency f of the piezoelectric element and becomes the characteristic 301 shown in FIG. 3. However, the displacement 1 with respect to a predetermined applied voltage V changes according to the temperature. As a result, the fuel quantity Q changes as shown by 302 and 303 in FIG. 3 and control to a stable injection quantity is not possible.

A piezoelectric element displays capacitive characteristics as electrical characteristics. The dielectric constant follows the Curie-Weiss relation and, for example, exhibits the characteristic shown by 401 in FIG. 4 with respect to a temperature T. Due to this, the following conclusion may be drawn upon consideration of the piezoelectric equation for the piezoelectric longitudinal effect shown in the above application. That is, the strain $\delta$ of the piezoelectric element is expressed by the following equation (1):

$$\delta = S^E \cdot F + d_{33} \cdot E \quad (1)$$

where,
- $S^E$: Elastic compliance
- F: Stress
- $d_{33}$: Piezoelectric constant
- E: Intensity of electric field Further, there is the relation of equation (2) between the piezoelectric constant $d_{33}$ and the dielectric constant $\epsilon$:

$$d_{33} = K \cdot \sqrt{\epsilon \cdot S^E} \quad (2)$$

where, K is a proportional constant. Therefore, from equations (1) and (2), $$\delta = S^E \cdot F + K\sqrt{\epsilon \cdot S^E \cdot E} \quad (3)$$

Further, since the displacement 1 is proportional to the strain $\delta$, the dielectric constant $\epsilon$ to the electrostatic capacity C, and the intensity of electric field E to the applied voltage V of the piezoelectric element, equation (3) can be transformed as follows:

$$1 = K_1 \cdot S^E \cdot F + K_2 \cdot \sqrt{S^E} \cdot \sqrt{CV^2} \quad (4)$$

Here, the stress F can be considered constant when an offset load is applied by a spring etc. since the strain of the piezoelectric element is extremely small. Therefore, the displacement 1 can be considered constant if $\sqrt{CV^2}$ is constant, since there is no effect of the fluctuation of the dielectric constant $\epsilon$.

However, $CV^2$ has dimensions of electrostatic energy stored in the piezoelectric element, so the displacement 1 can be controlled by the electrostatic energy applied to the piezoelectric element. FIG. 5 shows the experimental results of the relation between the displacement 1 and the temperature T in the case where the voltage is constant and the case where the energy is constant, designated by 501 and 502 respectively. The results verify the validity of equation (4).

The present invention was made based on the results of the above analysis and resolves the problems in the prior art. It is explained in detail below with reference to the embodiments.

Figure 6:
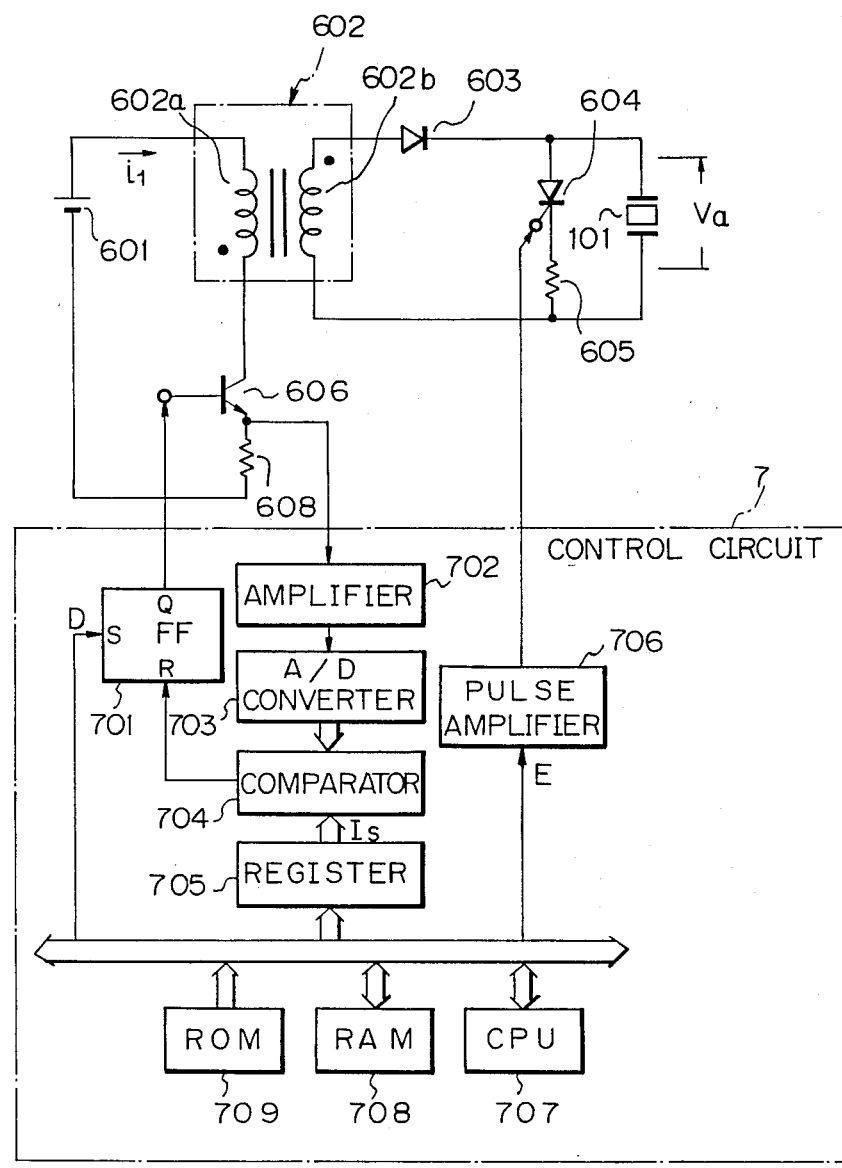
FIG. 6 is a circuit diagram showing the driving device for a piezoelectric element in accordance with a first embodiment of the present invention.

FIG. 6 shows a first embodiment of the present invention. Reference numeral 601 is a low voltage DC power source such as a starting battery of an automobile, 602 is a transformer having a core having an air-gap for constituting the magnetic circuit and having a primary winding 602a and a secondary winding 602b. The high voltage circuit portion on the secondary side is comprised of a diode 603, thyristor 604, discharge resistor 605, and piezoelectric element 101. Further, the primary winding 602a is connected to a transistor 606 which is connected to a current detecting resistor 608.

Further, the control circuit 7 is comprised of a flip-flop 701, an amplifier 702 connected to one end of the resistor 608, an analog-digital converter (A/D converter) 703, a comparator 704, a register 705, a pulse amplifier 706, a CPU 707, a RAM 708 for temporarily storing data, and a ROM 709 for permanently storing data or programs.

Figure 7:
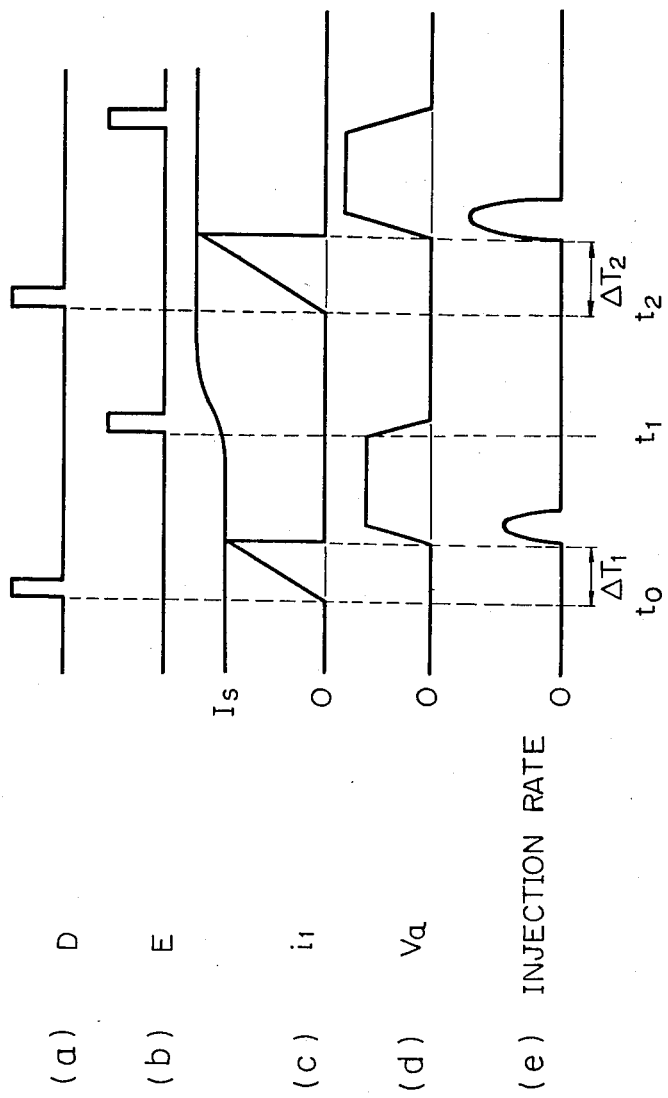
FIG. 7 shows the signals and operational waveforms of parts of the device shown in FIG. 6.

In the construction of FIG. 6, the electrostatic energy supplied to the piezoelectric element 101 is stored in the form of piezomagnetic energy in the air-gap of the case of the magnetic circuit of the transformer 602. This stored energy is discharged to the piezoelectric element. The operational waveforms are is shown in FIG. 7. Here, the signals D, E, and $I_S$ are signals from the main computer for engine control, comprised of the above CPU 707, RAM 708, ROM 709, etc. That is, the signal D shown in FIG. 7(a) is an injection command pulse which is input to the set input S of the flip-flop 701 at the time $t_0$ based on the results of the operation of the CPU 707. The output Q of the flip-flop 701 then becomes the level "1". As a result, the transistor 606 is turned ON and a current $i_1$ flows from the power source 601 of the output voltage E to the primary winding 602a of the transformer as shown by FIG. 7(c). The gradient of the current at this time is $di_1/d_t = E/L_1$, if the primary inductance of the transformer 602 is $L_1$. After a predetermined time has elapsed, that is after $\Delta T_1 = L_1 \cdot I_{S/E}$, the primary current $i_1$ rises until the current command value $I_S$ is reached as shown in FIG. 7(c). This current $i_1$ is detected by the current detecting resistor 608 and is input through the amplifier 702 and A/D converter 703 to the comparator 704. The comparator 704, as another input, receives the current command value $I_S$, which is set in the register 705 based on the results of the operation of the CPU 707. As mentioned above, when the primary current $i_1$ reaches the current command value $I_S$ after the time $\Delta T_1$, the comparator 704 outputs a trigger signal to the reset input R of the flip-flop 701, whereupon the output Q of the flip-flop 701 inverts and becomes the "0" level. As a result, the transistor 606 in turned OFF.

At this time, the transformer 602 has stored therein the electromagnetic energy of $\frac{1}{2}(L_1 \cdot I_S^2)$. This electromagnetic energy is stored as the electrostatic energy of the piezoelectric element 101 through the diode 603 since the secondary winding 602b is wound closely linked to the primary winding 602a. The terminal voltage $V_a$ of the piezoelectric element at this time, as shown by FIG. 7(d), rises to $V_a = i_S \cdot \sqrt{L_1/C}$. As a result, the piezoelectric element 101 expands and fuel is injected at an injection rate shown by FIG. 7(e) from the fuel injection valve 104 of FIG. 1. Next, based on the results of the operation of the CPU 707, at time $t_1$, the intake command pulse E shown in FIG. 7(b) is input to the pulse amplifier 706, is amplified in power by the pulse amplifier 706, and is suppled to the gate of the thyristor 604. The thyristor 604 is turned ON and electric charges stored in the piezoelectric element 101 are discharged via the discharge resistor 605. The piezoelectric element 101 then contracts and so the unit injector 100 takes in fuel. After this, starting from time $t_2$, processing of the injection command begins in the same way as above and injection is performed after a time $\Delta T_2$.

Figure 8:
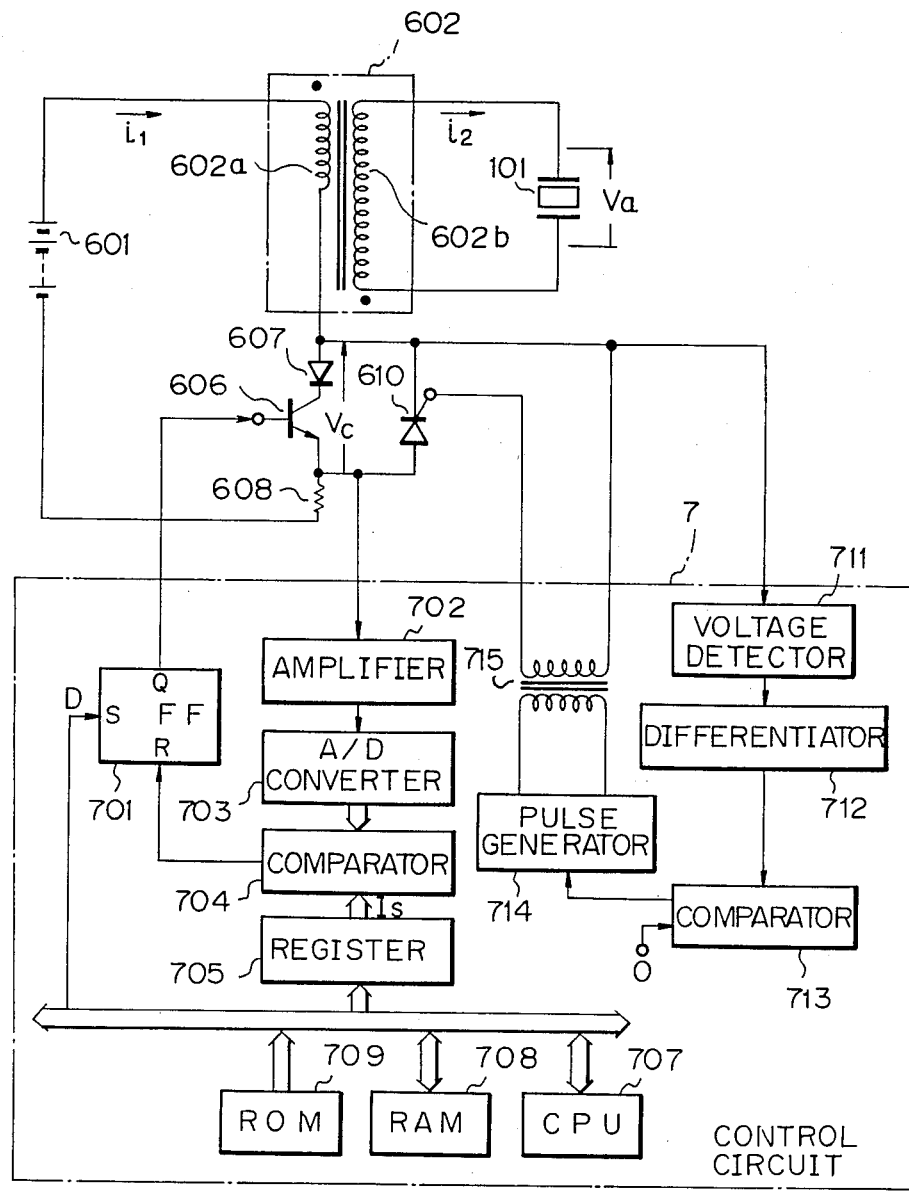
FIG. 8 is a circuit diagram showing the driving device for a piezoelectric element in accordance with a second embodiment of the present invention.

FIG. 8 shows a second embodiment of the present invention. Portions bearing the same reference symbols as in the embodiment of FIG. 6 have the same functions. In this embodiment, the two ends of the secondary winding 602b of the transformer 602 are directly connected to the piezoelectric element 101, forming a closed circuit. Note that a diode 607 is provided for reverse bias protection for the transistor 606.

In the embodiment shown in FIG. 8, there is provided a thyristor 610 connected in parallel with the transistor 606. Further, as the control circuit 7, there are provided a voltage detector 711, a differentiator 712, a comparator 713, a pulse generator 714, and a pulse transformer 715. The thyristor 610 is connected at its cathode to the collector of a transistor 606 through a diode 607 and at its anode to the emitter of the transistor 606. Further, between the gate and cathode of the thyristor 610 are connected to the two ends of the secondary winding of the pulse transformer 715. The voltage detector 711 is for the detection of the collector-emitter voltage $V_c$ of the transistor 606. The differentiator 712 is for differentiating the output signal $V_c$ from the voltage detector 711. The comparator 713 performs a comparison of the signal from the differentiator 712 and the zero voltage and, when the value of the former is smaller than the value of the latter, outputs a pulse signal. The pulse generator 714 is designed to output a pulse at the trailing edge of the output signal of the comparator 713. This pulse is made to be supplied to the primary winding of the above pulse transformer 715. Therefore, at the point of time when the pulse is output from the pulse generator 714, a pulse signal is applied to the gate of the thyristor 610 through the pulse transformer 715.

Figure 9:
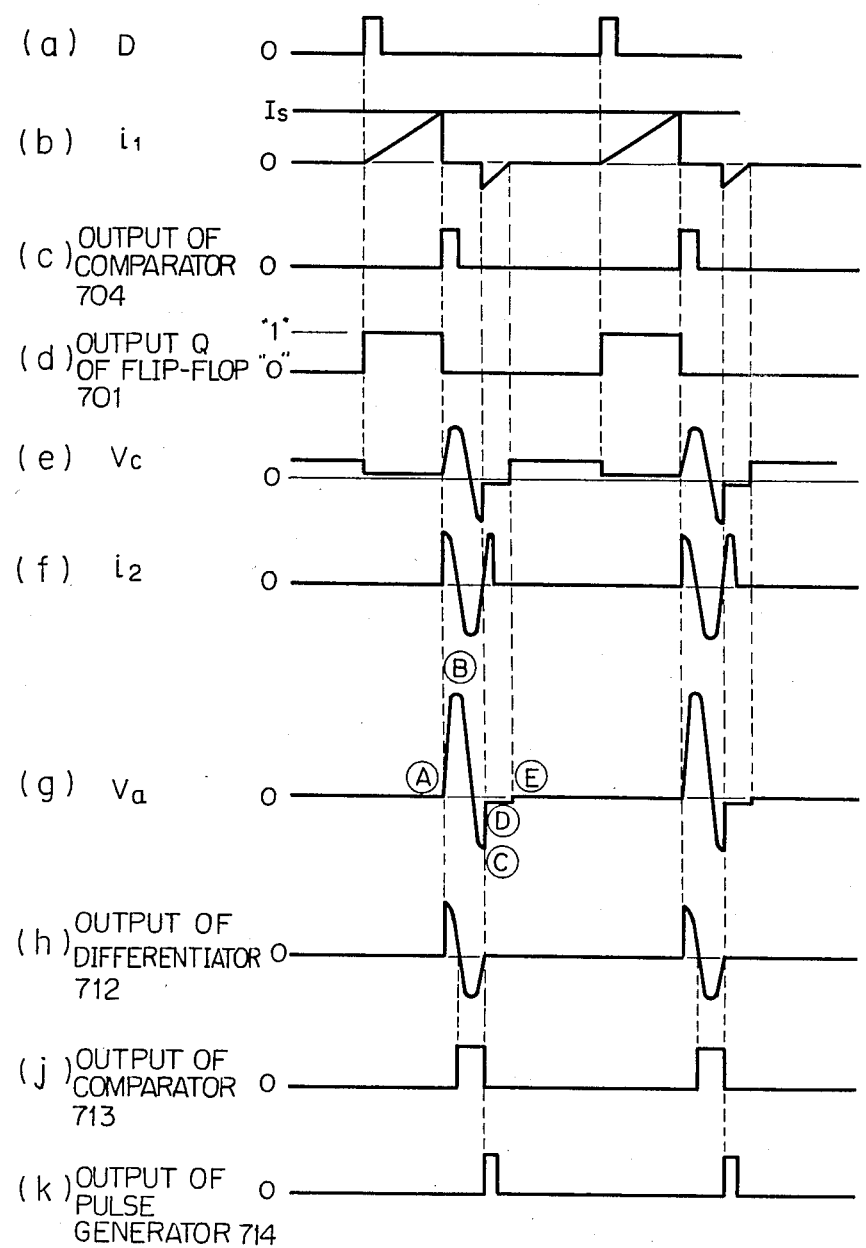
FIG. 9 shows the signals and operational waveforms of parts of the device shown in FIG. 8.

FIG. 9 shows the signal waveforms of portions of the device shown in FIG. 8. Below, the operation of the device of FIG. 8 will be described in detail along with FIG. 9.

First, the initial state is considered to be that with no flow of primary current $i_1$. Here, if the drive signal D shown in FIG. 9(a) is input to the S terminal of the flip-flop 701, the output Q of the flip-flop 701 becomes the "1" level (FIG. 9(d)) and the transistor 606 is turned ON. By this, the collector potential $V_c$ of the transistor 606 falls to almost the zero level (FIG. 9(e)) and the primary current $i_1$ begins to increase (FIG. 9(b)) by the loop of the DC power source 601—primary winding 602a of the transformer 602—diode 607—transistor 606—current detection resistor 608—DC power source 601. This primary current $i_1$ is detected by the current detection resistor 608, is amplified by the amplifier 702, is A/D converted by the A/D converter 703, and is compared by the comparator 704 with the set current signal $I_S$ input from the register 705. When the value of the detected primary current $i_1$ reaches the value of the set current signal $I_S$, a pulse signal is output from the comparator 704 (FIG. 9(c)), whereby the output Q of the flip-flop 701 becomes the "0" level (FIG. 9(d)) and the transistor 606 is turned OFF.

From this instant, LC resonance begins between the secondary winding 602b (inductive) of the transformer 602 and the piezoelectric element 101 (capacitive). A secondary current $i_2$ (oscillating current) begins to flow through the closed circuit. In this case, the secondary current $i_2$, if the piezoelectric element 101 does not store a charge, is substantially the current expressed by the following equation:

$$i_2 = (N_1/N_2)I_S \cos \omega t$$

(where, $\omega = 1/\sqrt{L_2 C}$) Here, $N_1$ and $N_2$ are the number of turns of the primary winding 602a and the secondary winding 602b, $L_2$ is the inductance of the secondary winding 602b, and C is the capacitance of the piezoelectric element 101. In accordance with the changes in the secondary current $i_2$ (FIG. 9(f)), the applied voltage $V_a$ of the piezoelectric element changes as shown in FIG. 9(g).

When the transistor 606 is turned OFF and the primary circuit of the transformer is opened, the waveform of the potential appearing at the opening point, that is the collector potential $V_c$ of the transistor 606, becomes similar to the applied voltage $V_a$ of the piezoelectric element 101 due to the action of the transformer 602 (FIG. 9(e)). This collector potential $V_c$ is detected by the voltage detector 711 and is differentiated at the differentiator 712 (see FIG. 9(h)) and then is compared with the zero level at the comparator 713. When the detected collector potential $V_c$ is lower than the zero level, a pulse signal is output from the comparator 713 (see FIG. 9(j)). A pulse is output from the pulse generator 714 upon the trailing edge of the pulse signal output from the comparator (see FIG. 9(k)). This pulse is supplied to the gate of the thyristor 610 via the pulse transformer 715. By this, the thyristor 610 is turned ON and the primary circuit of the transformer 602 is closed.

Just before the time (point C in FIG. 9(g)) when the primary circuit is closed by the thyristor 610, the collector potential $V_c$ of the transistor 606 becomes negative. Therefore, if the primary circuit of the transformer is closed at this time, the primary current $i_1$ flows in the reverse direction than the arrow of FIG. 8, whereupon the energy of the secondary circuit is regenerated to the DC power source 601 via the primary winding 602a. At this time, the collector potential $V_c$ becomes zero, the LC resonance of the secondary circuit stops, and the applied voltage $V_a$ of the piezoelectric element 101 becomes substantially zero as shown by FIG. 9(g) (point D). This applied voltage $V_a$ becomes completely zero at the point of time (point E) when the primary current $i_1$ becomes zero, as shown in FIG. 9(b).

Now, when the unit injector shown in FIG. 1 is driven by the device shown in FIG. 8, the points A to E shown in FIG. 1 indicate the positions of the ends of the piston 102 and correspond to the changes A to E of the applied voltage $V_a$ of the piezoelectric element shown in FIG. 9(g). That is, according to the construction shown in FIG. 8, the piezoelectric actuator constructed by the piezoelectric element 101 performs one dynamic reciprocal motion, then is held in a single stationary state, this constituting one unit of the movement.

Figure 12:
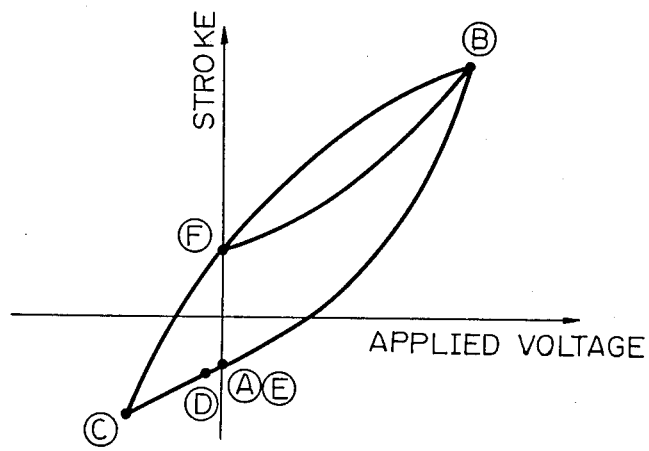

Note that FIG. 12 shows the relation between the voltage applied to the piezoelectric element and the stroke of the piezoelectric actuator. A to E correspond to the positions of the ends of the piston 102 of FIG. 1. As is clear from this figure, the operation of this embodiment involves passage through the uppermost part and lowermost part of a hysteresis curve, so the maximum stroke of the actuator can be ensured just as if use was made of a power control element in the secondary circuit of the transformer.

As explained above, according to the embodiment shown in FIG. 8, LC resonance of the secondary circuit is used without using a power control element in the secondary circuit which would require high voltage resistance and the resonance is stopped at $\frac{3}{4}$ of a cycle after the start of the LC resonance so as to perform one reciprocal motion of the actuator. Further, the same path of as the hysteresis curve is followed so as not to impair the stroke of the actuator, so excellent control is possible and the circuit construction can be made relatively simple. Further, the cycle of the pulse-like drive signal D is variable, so it is possible to control the time interval from when the actuator makes one reciprocal motion to when it makes the next reciprocal motion (control the frequency). Further, the value of the set current signal $I_S$ is variable, so stroke control of the actuator is possible.

Figure 10:
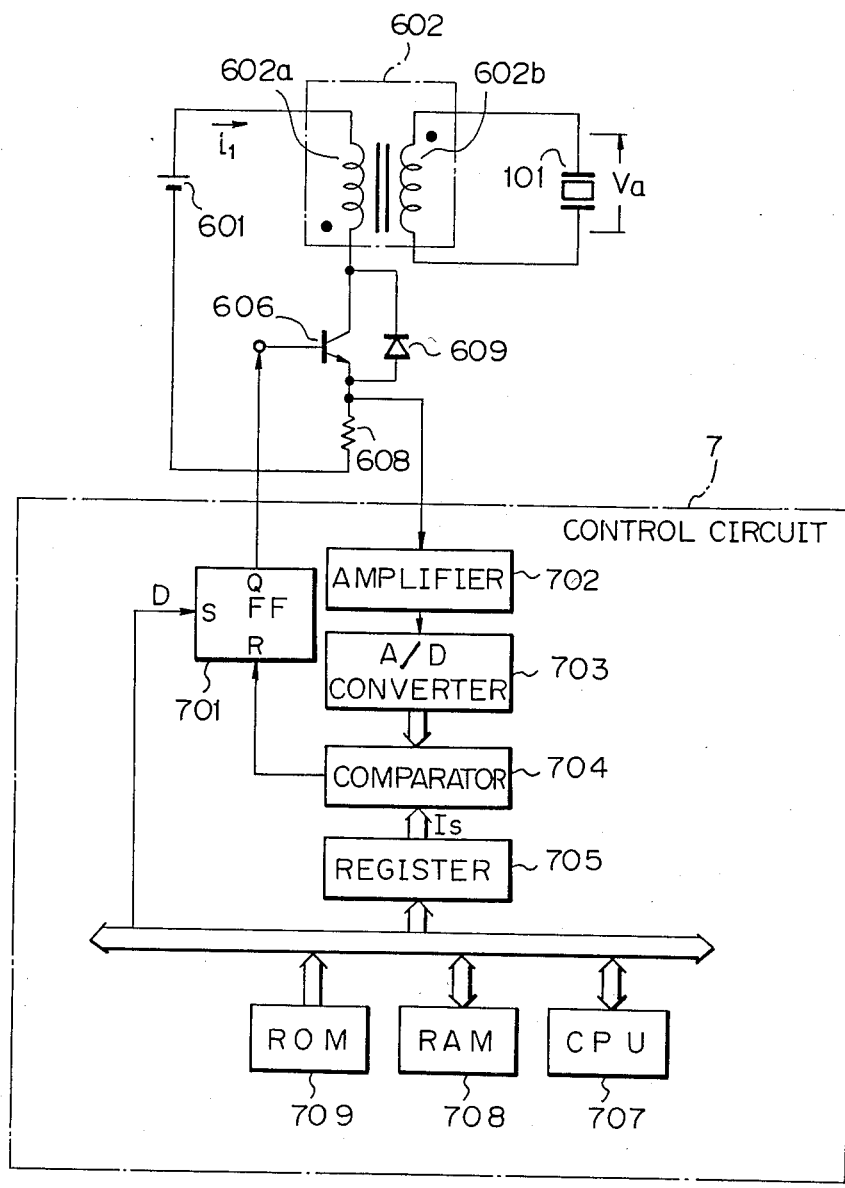
FIG. 10 is a circuit diagram showing the driving device for a piezoelectric element in accordance with a third embodiment of the present invention.

FIG. 10 shows a third embodiment of the present invention, wherein portions with the same symbols as in the embodiment of FIG. 6 have the same functions. In this embodiment, use is made of a diode 609 connected in parallel with the transistor 606 instead of the thyristor 610 and control circuit thereof of FIG. 8. The operation of this embodiment is equivalent to the case where the turn ON timing of the thyristor 610 in the case of the embodiment shown in FIG. 8 is made at the point of time of ½ a cycle after the start of LC resonance based on the cutting OFF of the primary current (FIG. 11(c)). At this time, the end of the piston 102 of FIG. 1 is positioned repeatedly between B and F of FIG. 12. The stroke of the piezoelectric element is somewhat reduced, but there is no reverse voltage on the piezoelectric element, so the deterioration of the element is reduced and thus there is no need for a device for detecting the applied voltage of the piezoelectric element and obtaining a predetermined regeneration timing. The construction of the circuit can therefore be further simplified from the case of the embodiment of FIG. 8.

Figure 11:
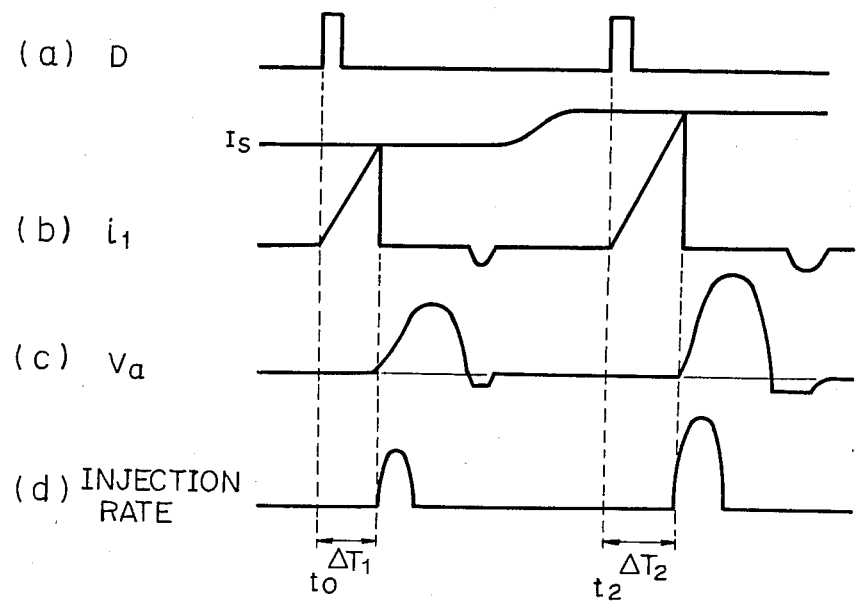
FIG. 11 shows the signals and operational waveforms of parts of the device shown in FIG. 10.

In this connection, in the unit injector shown in FIG. 1, the time when the piezoelectric element expands may be the extremely short time until the completion of the pressurized fuel injection. Therefore, such unit injector can be also realized by the circuit construction of FIG. 10 by making the resonance cycle of the secondary circuit larger than this time. That is, in FIG. 10, with a secondary inductance $L_2$ of the transformer 602 and an electrostatic capacity C of the piezoelectric element, the resonance cycle becomes $T = 2\pi\sqrt{L_2 C}$. By making this resonance cycle T sufficient larger than the time of completion of the pressurized fuel injection as shown in FIG. 11(c), it is possible to omit the above circuit elements of the secondary circuit of the transformer. Here, the diode 609 prevents mistiming injection resulting from resonance and restricts the reverse voltage applied to the transistor 606, and regenerates the electrostatic energy stored in the piezoelectric element 101 to the power source 601.

Also, in the embodiment of FIG. 10, compared with the embodiment of FIG. 6, it is necessary to reduce the turn ratio of the primary winding and the secondary winding so as to prevent mistiming injection at the end of the regeneration.

Further, in the embodiment shown in FIG. 8, the regeneration timing was set to the point of time of ¾ a cycle after the start of LC resonance so as to maximize the stroke of the actuator, but the invention is not limited to the same. Regeneration is possible during the period when the collector potential $V_c$ of the transistor 606 is negative, so it is possible to set the regeneration timing and close the primary circuit at any time within this period, i.e., in the period from ½ to 1 cycle after the collector potential $V_c$ starts oscillation. In this case, separate detection means are used instead of the differentiator 712 and the comparator 713.

Figure 13:
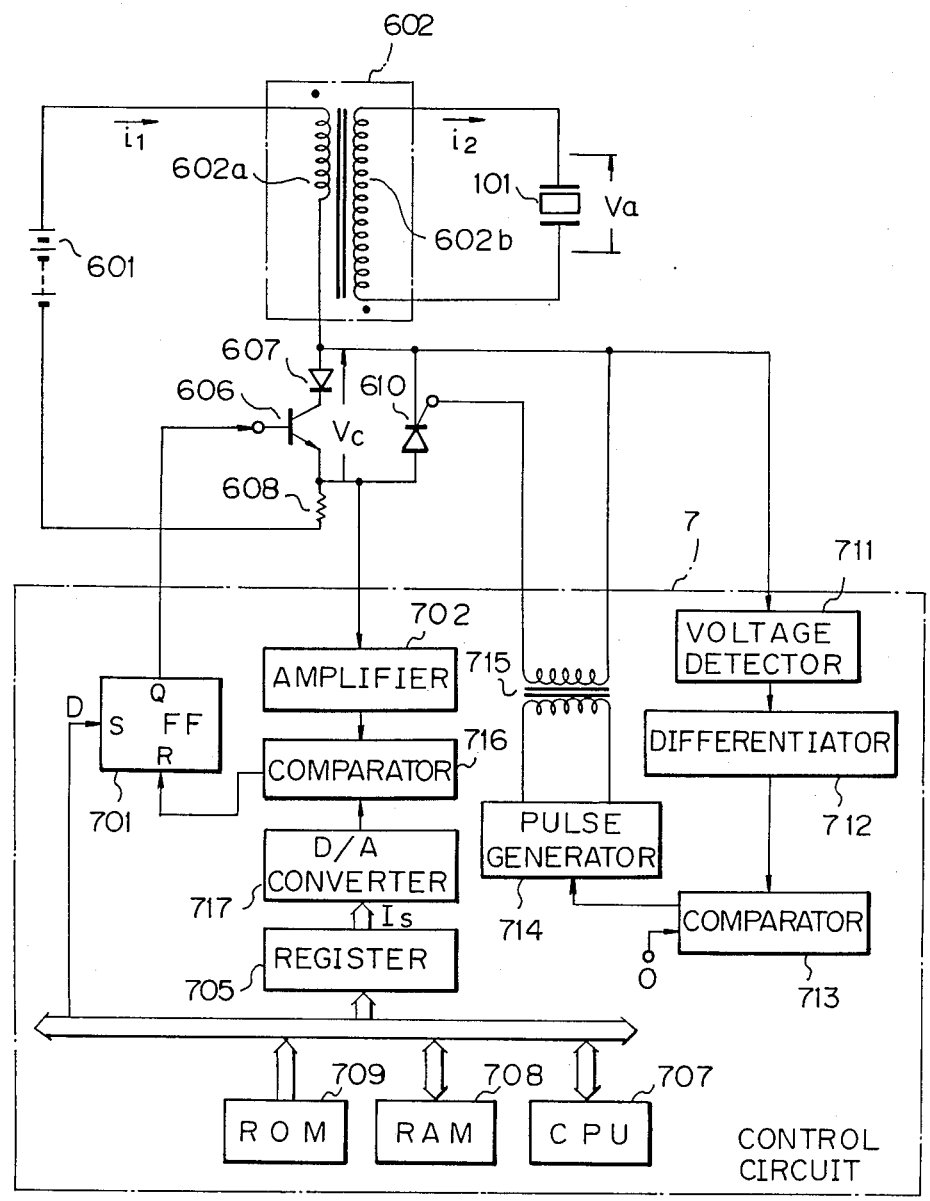
FIG. 13 is a circuit diagram showing the driving device for a piezoelectric element in accordance with a fourth embodiment of the present invention.

FIG. 13 shows a fourth embodiment of the present invention. Portions bearing the same reference symbols as in the embodiment of FIG. 8 have the same functions. In the embodiment shown in FIG. 13, there are provided an analog comparator 716 and a digital-analog converter (D/A converter) 717, instead of the A/D converter 703 and the comparator (digital comparator) 704 shown in FIG. 8.

As above mentioned, the primary current $i_1$ is detected by the current detecting resistor 608 and is input through the amplifier 702 to the analog comparator 716. The current command value $I_S$ is set in the register 705 based on the results of the operation of the CPU 707, and the analog comparator 716, as another input, receives the current command value $I_S$ as an analog value from the register 705 through the D/A converter 717. Thus, when the primary current $i_1$ reaches the current command value $I_S$, the analog comparator 716 outputs a trigger signal to the reset input R of the flip-flop 701, and as a result, the transistor 606 is turned OFF. Except for the above, the operation of the embodiment shown in FIG. 13 is similar to that shown in FIG. 8.

As is clear from the above, according to the present invention, the amount of energy supplied to the piezoelectric element is controlled to the target value, so as mentioned above the displacement 1 becomes constant regardless of the change of the electrostatic capacity of the piezoelectric element arising from temperature changes. As a result, for example, it is possible to stably control the injected fuel as well.

Further, according to the present invention, the energy supplied to the piezoelectric element is controlled by the electromagnetic energy stored in the air-gap of the case of the transformer, so there is no need for a special device which boosts a low voltage source of about 12 to 24V, such as a starting battery, to a high voltage of about 100 to 1000V required for driving the piezoelectric element. Further, control of the energy by the primary current of the transformer is easy, so there can be provided a driving device for a piezoelectric element which is extremely small in size and features good controllability.

Further, the transformer is provided with a secondary winding which is insulated from the primary winding and supplies power to the piezoelectric element by the secondary winding, so the potential of the primary side is irrelevant to the potential of the secondary side. As a result, the voltage resistance of the switching element can be made low. Even with automobiles with body grounding, two-wire system wiring is possible wherein the piezoelectric element is wired electrically "floating" from the body with no body grounding, thus reducing the high voltage dangers. In other words, so long as one does not touch the two ends of the piezoelectric element, there is no danger of electric shock. By way of note, the electrostatic capacity of the piezoelectric element is extremely small compared with the electrostatic capacity of a filtering capacitor in the case of use of a DC high voltage power source, so, according to the present invention, the amount of high voltage energy stored in the piezoelectric element is extremely small and, further, the high voltage energy is stored only upon driving of the piezoelectric element. This results in much greater safety compared with the case of use of a DC high voltage power source.

Further, according to the present invention, it is possible to achieve repetitive movement of the piezoelectric actuator consisting of units of a single reciprocative motion, followed by holding at a single stationary state. Further, since the cycle of the drive signal D and the set value $I_S$ are variable, both frequency control and stroke control of the piezoelectric actuator are possible.

Further, in the case of use of the diode 609 as in the embodiment of FIG. 10, the stroke of the piezoelectric actuator is somewhat reduced, but it is possible to prevent deterioration of the piezoelectric element since the element is not subjected to reverse voltage and, further, it is possible to further simplify the circuit construction.

In the embodiment described above, the electromagnetic energy supplied to the piezoelectric element and used for the control of the injection quantity of the unit injector shown in FIG. 1 is controlled by the primary current $i_1$ of the transformer, but control by the product of the voltage E applied to the primary winding and the applied time t may also be used. In the case where the voltage E is constant, control of course is also possible by just the time t. It in no way impairs the effects of the present invention.

Further, in the embodiment described above, use is made of the transistor 606 as the element for closing and opening the primary circuit, but the invention is not limited to this. For example, use can be made of a GTO (gate turn OFF type thyristor).

We claim:

1. A driving device for a piezoelectric element for electrically driving a piezoelectric element to obtain a predetermined mechanical displacement, comprising
    a transformer comprising a core having an air-gap, a primary winding and a secondary winding connected to the piezoelectric element, the air-gap of the core of said transformer being adapted to store energy for driving said piezoelectric element;
    a switching element connected to the primary winding of said transformer for controlling the amount of energy stored in the air-gap of the core of the transformer, said energy being transmitted to the secondary winding of said transformer; and
    energy control means for driving the switching element so that the amount of energy stored in the air-gap of the core of the transformer becomes a set value, said energy control means being provided with means for turning on said switching element and means for detecting the current flowing in said primary winding and turning off said switching element when the value of the current reaches a predetermined value, the displacement of the piezoelectric element being controlled by the amount of energy stored in the air-gap of the core of the transformer.

2. A driving device for a piezoelectric element according to claim 1, further comprising means connected in parallel with said switching element for closing a primary circuit of said transformer at a predetermined point of time in the interval from ½ a cycle to 1 cycle after the start of oscillation of an oscillating potential appearing at an opening point of said primary circuit.

3. A driving device for a piezoelectric element according to claim 2, including as a primary circuit closing means a thyristor connected in parallel with said switching element.

4. A driving device for a piezoelectric element according with claim 2, using as a primary circuit closing means a diode connected in parallel to said switching element.

5. A driving device for a piezoelectric element according to claim 1, wherein said driving device is provided in a fuel injection device and further comprises pressurizing means which receives the displacement of said piezoelectric element to pressurize the fuel, the amount of energy stored in said transformer being used for control of the displacement of the piezoelectric element and thus for control of the quantity of injection of the fuel.

* * * * *